May 22, 1923.

P. EISENBACH

SPRING RIM

Filed April 17, 1922

INVENTOR.
BY Peter Eisenbach
Stuart E. Barnes
ATTORNEY.

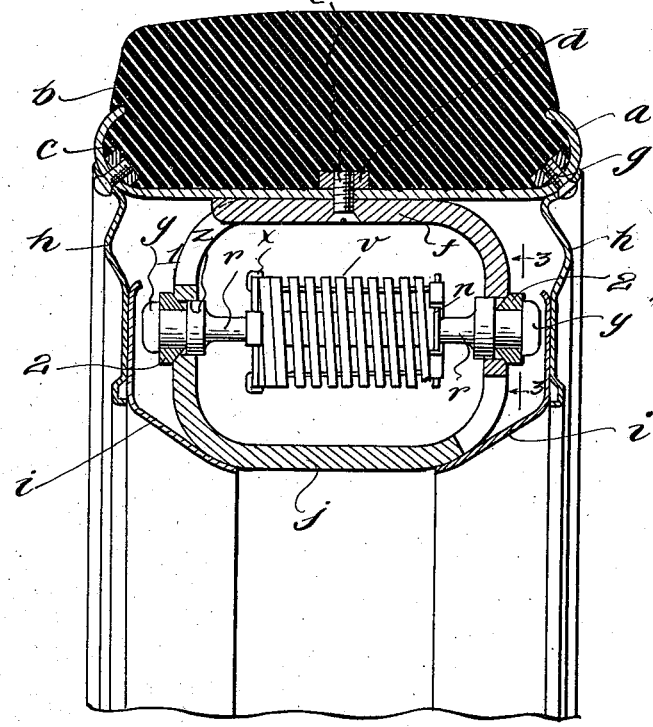

Patented May 22, 1923.

1,455,997

UNITED STATES PATENT OFFICE.

PETER EISENBACH, OF DETROIT, MICHIGAN.

SPRING RIM.

Application filed April 17, 1922. Serial No. 553,913.

*To all whom it may concern:*

Be it known that PETER EISENBACH, a citizen of the United States, residing at Detroit, in the county of Wayne and State of Michigan, has invented certain new and useful Improvements in Spring Rims, of which the following is a specification.

This invention relates to spring rims and has for its object a detachable spring rim assembly which can be slipped on or off an ordinary automobile wheel the same way that a tire and rim are. This spring rim is made up of an outer ring and an inner ring provided with staggered spring-carrying flanged segments. These rings are kept in normal concentric relation by a plurality of springs. The springs and rings are encased in a closed chamber.

There are features of novelty also in the support of the springs and their connection with the segmental flanges which will be described in detail in the description following.

In the drawings:

Fig. 2 is a cross section through the same.

Fig. 3 is a section on the line 3—3 of Fig. 2.

Fig. 4 is a detail and perspective of one of the spring unit sliding shells or barrels.

Fig. 5 is a detail in perspective of one of the washers.

Fig. 6 is a detail and perspective of one of the studs used to fasten the spring unit to the flange segment.

Figure 1:
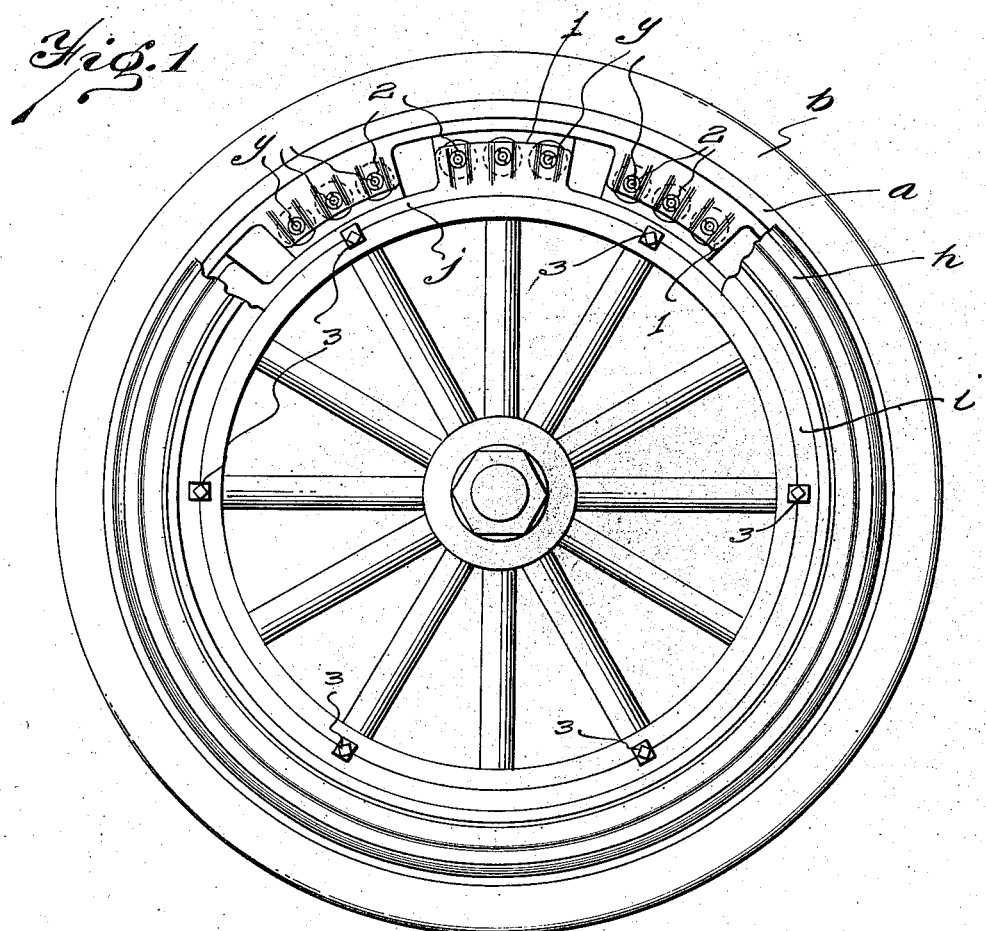
Fig. 1 is a side elevation of a complete wheel showing my detachable spring rim in place.

The rim comprises the usual tire channel ring $a$ provided with clencher flanges securing the rubber tire $b$ in place. The nuts $c$ and $d$ are molded in the rubber tire. Nuts $d$ serve in connection with the bolts $e$ for the attachment of the outer segmentally flanged ring $f$ to the channel. The nuts $c$ in connection with the bolts $g$ serve for detachably connecting the corrugated side rings $h$ to the tire channel ring $a$. These side rings make contact with the inner side rings $i$ which are of angular metal section. The outer side rings $h$ engage the inner side rings $i$ and have enough spring so that when all the rings are secured in place the outer side rings are slightly distorted outwardly, thereby forming a closed chamber in connection with the inner segmentally flanged ring $j$ to which the inner side rings $i$ are secured by spot-welding or otherwise. By referring to Fig. 1 it will be seen that the inner and the outer segmentally flanged rings have corrugated flange segments in staggered relation so as to balance the rings on opposite sides.

Now the primary idea is to provide compression springs between opposed flange segments that are slightly under compression when the rings are in normal concentric relation. When the rings move into eccentric relation these springs adapt themselves to varying conditions, met either at the top, bottom or sides of the rings. These laterally disposed springs are superior to the ordinary radially acting springs used in cushion wheels for the reason that all of them resist any eccentric movement of the inner and outer rings. Any movement of one ring with respect to the other from the concentric relation results in the elongation of the connection between the rings and consequently is resisted by the springs.

Figure 7:
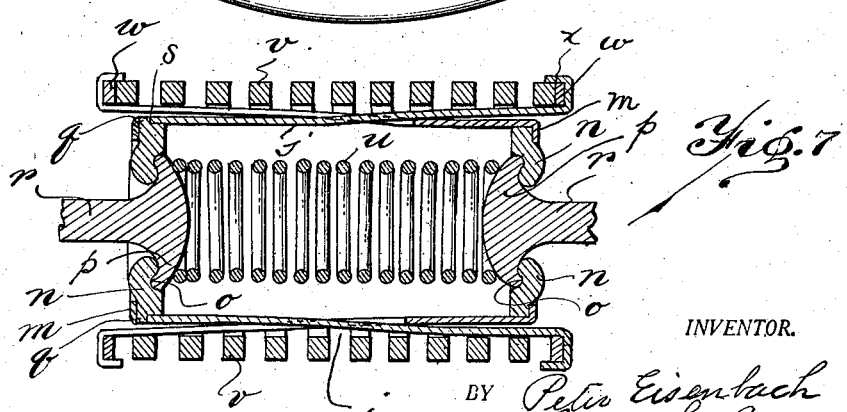
Fig. 7 is a detail sectional view of the spring unit.

Now to give a more minute explanation of the spring unit. Each unit is made up of a pair of inter-engaged or sliding hollow cylinders $j$. The cylinder at one end is slotted to form the prongs $k$ so that the prongs of one cylinder engage the body of the other cylinder and the two cylinders telescope together without the one being wholly on the outside of the other or vice versa. These cylinders are stamped metal parts having the body end of the cylinder turned over into an angular flange $m$. This flange $m$ supports a special washer $n$ (see Fig. 5 and Fig. 7). This washer has an annular concave groove $o$ arranged to take the mushroom head $p$ of the stud $r$. This washer is provided with key lugs $q$ arranged to project through the slots $s$ in the body of the cylinder so as to lock the lugs in place. These cylinders are each split as at $t$ (Fig. 4) so they may be assembled on the washers $n$ by wrapping the cylinder around the washer the mushroom head of the studs $r$ being on the inside of the washer. The coiled spacing spring $u$ is interposed between the two mushroom heads $p$; on the outside of the two inter-engaging sliding slotted cylinders $j$ is the large compression spring $v$, the ends of which abut against washers $w$ and the ends $x$ of prongs $k$ engage against this washer on the outside.

The purpose of these sliding inter-telescoping slotted cylinders is to connect one end of the spring to the stud at the opposite end and conversely the other end of the spring in the same way, so that elongation of the distance from stud to stud in normal concentric relation of the rings is resisted by the strong compression spring. In short the purpose of this spring unit is to afford a compression spring so arranged that it tends to keep the unit in a shortened condition and well centred and resists an elongation of the unit.

The heads $y$ at the outside ends of the studs can be passed through the openings $z$ in the flange segments 1 from the inside by a suitable tool or fixture; the studs may be temporarily spread apart after they have been passed through the opening $z$ and the beveled split washers 2 inserted. When the tool is released, obviously the compression spring $v$, if it be of the correct length, will place the studs both under some tension so as to hold the parts of the split washers in their sockets. These split washers will prevent the stud heads $y$ from pulling through the openings $z$.

The outer segmentally flanged ring $f$ will have to first be fastened to the tire channel $a$ before the spring units are assembled to the two segmentally flanged rings, preferably the inner side rings $i$ are welded to the inner segmentally flanged ring after the spring units are assembled, then the outer side rings $h$ are secured to the tire channel by the bolts $g$. This completes the assembly.

By providing the mushroom heads for the studs together with the special washer with a concave annular groove the spring unit can rock with little friction or wear on the mushroom end of the stud which will remain substantially rigid, when the spring unit assumes an oblique position due to any eccentric movement of one ring with respect to the other.

This composite cushion rim can be made to size for any of the standard make of cars and can be attached to the felloe of the wheel in the same way that any demountable rim is by the usual tire securing lugs 3.

What I claim is:

1. In a traction wheel, a composite spring rim comprising a tire channel, a pair of flanged rings, one arranged in concentric relation within the other, compression spring elements connecting the same and tending to resist eccentric movement of one ring with respect to the other, the outer ring being secured to the tire channel, a pair of outer side spring rings detachably secured to the tire channel, a pair of inner side spring rings secured to the inner first mentioned ring, the side rings at each side having spring contact, but in sliding relation, to permit the eccentric movement of the parts of the wheel and at the same time housing the first mentioned rings and the springs.

2. In a traction wheel, an outer ring and inner ring and compression spring units connecting the rings and resisting eccentric movement each comprising inter-telescoping cylinders, coiled compression springs on the outside of the cylinders, each cylinder being connected to one of the rings and the sliding inter-telescoping cylinders serving to transfer the tension at one end of the spring to the opposite end and converting the tension into a compression strain instead of a tension strain on the spring.

3. In a traction wheel, an inner ring, an outer ring and a plurality of compression spring units connecting the rings comprising each a stud provided with a mushroom head and washers provided with concave annular grooves on their insides which permit the washers to rock on the mushroom heads, coil springs, and means for connecting the washers with the opposite ends of the coil spring and for supporting the springs.

4. In a wheel, the combination of an outer ring, an inner ring and compression spring units connecting the rings comprising each a pair of studs with a mushroom head, washers for engaging the mushroom heads having complementary formed surfaces, a pair of inter-telescoping cylinders and a coiled compression spring coiled around the inter-telescoping cylinders, the said inter-telescoping cylinders holding the washer at one end and engaging the spring ends at the other end for converting a tension strain into a compression strain upon the spring.

5. In a traction wheel, an inner ring, an outer ring and a plurality of compression spring units connecting the rings comprising each a pair of studs with mushroom heads, washers for engaging the same, a pair of inter-telescoping cylinders formed by a stamping, having a plurality of elongated tongues spaced apart adapted to telescope together and outwardly turned up ends for engaging a coiled compression spring coiled around the inter-telescoping cylinders.

6. In a traction wheel, an inner ring, an outer ring and a plurality of compression spring units connecting the rings, comprising a pair of inter-telescoping cylinders provided with telescoping tongues with outwardly turned up ends and having slots in the body thereof, a pair of studs with mushroom heads, washers for engaging the same provided with outwardly extending lugs adapted to engage in the slots in said inter-telescoping cylinders, and a coiled compression spring coiled around the inter-telescoping cylinders, the said inter-telescoping cylinders holding the washer at one end and engaging the spring ends at the other end for converting a tension strain into a compression strain upon the spring.

7. In a traction wheel, an inner ring, an outer ring and a plurality of compression spring units connecting the rings, comprising a pair of studs with mushroom heads, washers engaging the same, a compression member interposed between said mushroom heads, a pair of inter-telescoping cylinders having elongated tongues spaced apart adapted to telescope together and outwardly turned up ends for engaging a coiled compression spring mounted around the periphery of said cylinders.

8. In a traction wheel, a demountable spring rim comprising a tire channel, a pair of concentric flanged rings and the outer one secured to the tire channel, spring elements tending to hold the rings in concentric relation, and a housing each side of which is composed of a pair of concentric spring rings having a sliding contacting relation with each other to permit the eccentric movement of the parts.

9. In a traction wheel, the combination of a wheel member provided with a felloe, a demountable rim, including a pair of segmentally flanged rings having openings in the flanges, and a compression spring element having a pair of studs, each provided with a groove near the outer end, attached thereto, one at each end of the spring element, said studs being adapted to be pulled outwardly through the openings in said flanges and secured therein by means of split washers of a larger diameter than the openings in said flanges, fitting in said grooves and resisting an elongation of the distance normally existing when the rings are in concentric relation.

10. In a traction wheel, the combination of a tire channel, an inverted outer channel ring attached thereto and having portions of the flanges cut away to form flange segments arranged in staggering relation on opposite sides of the channel ring, a second or inner channel ring supported inside of said inverted channel ring and having its flanges cut away to form flange segments arranged in staggered relation on opposite sides of the said channel ring, the outwardly projecting flange segments of the inner channel ring fitting between the inwardly projecting flange segments of the outer channel ring, yieldable means connecting transversely opposed pairs of flange segments of the outer and inner rings, and means for closing the inner and outer channel rings at the sides.

11. In a traction wheel, the combination of a tire channel, a pair of concentric channel rings one being attached to the tire channel and having portions of the flanges cut away to form flange segments arranged in staggered relation on opposite sides of the channel ring, said flange segments having radially extending corrugations, yieldable means connecting opposed pairs of flange segments, and means for closing the channel rings at the sides.

In testimony whereof I affix my signature.

PETER EISENBACH.